Nov. 3, 1959

F. M. KRANTZ 2,910,782

LEVEL INDICATING DEVICE

Filed March 14, 1958

INVENTOR.
FRANK M. KRANTZ
BY
ATTORNEYS

Nov. 3, 1959   F. M. KRANTZ   2,910,782
LEVEL INDICATING DEVICE
Filed March 14, 1958   2 Sheets-Sheet 2

INVENTOR.
FRANK M. KRANTZ
BY
ATTORNEYS

United States Patent Office 2,910,782
Patented Nov. 3, 1959

2,910,782

LEVEL INDICATING DEVICE

Frank M. Krantz, Ellicott City, Md., assignor, by mesne assignments, to the United States of America as represented by the Secretary of the Air Force Application March 14, 1958, Serial No. 721,614

2 Claims. (Cl. 33—206)

This invention relates to a levelling device with visual indicating means to show the direction and the degree of deviation from the horizontal and when the device is perfectly levelled. It is useful in indicating the level of an operating device whether at a distance from the operator or nearby and as a warning when the device is out of level. It is particularly useful in levelling a stacked-beam radar height-finding system where the level accuracy is critical.

There are various levelling devices which use liquids or metal balls to complete electric circuits to light bulbs or actuate annunciating devices but none employing the unique construction of this invention, furnishing its accuracy and the combined functions of warning when the device is out of level, the direction and degree of tilt.

It is an object of this invention to provide a simple, accurate levelling device to warn an operator when the device is out of level, in what direction it is out of level and the degree of deviation from a true level.

With the above and other objects in view, the invention will now be described with particular reference to the accompanying drawings in which.

Essentially, the invention consists of a plate, which may be a disc of metal or plastic, with a depression in the center to act as a reservoir for a pool of mercury. Extending radially from this center reservoir are three grooves 120° apart deeper at the center and becoming shallower toward the periphery of the disc. Each of the three grooves is drilled at regular intervals and electrical contacts inserted. If a metal plate is employed, the contacts are insulated. Each contact is wired to a light bulb in series with a source of power and the control pool of mercury so that when the plate is tilted mercury will flow from the central pool into one or two of the grooves thus completing the electric circuit through the bulb and power source and causing one or more bulbs to light. Since the groove is graduated in depth from the center toward the periphery the amount of tilt will be indicated by the number of bulbs lighted. Each groove has its own string of lights which may be distinctively colored, such as red for the first groove, green for the next and yellow for the third. If four red bulbs light and two green it indicates the tilt is in a direction between the red and green grooves and that the major correction will have to be made in the red leg.

Figure 1:
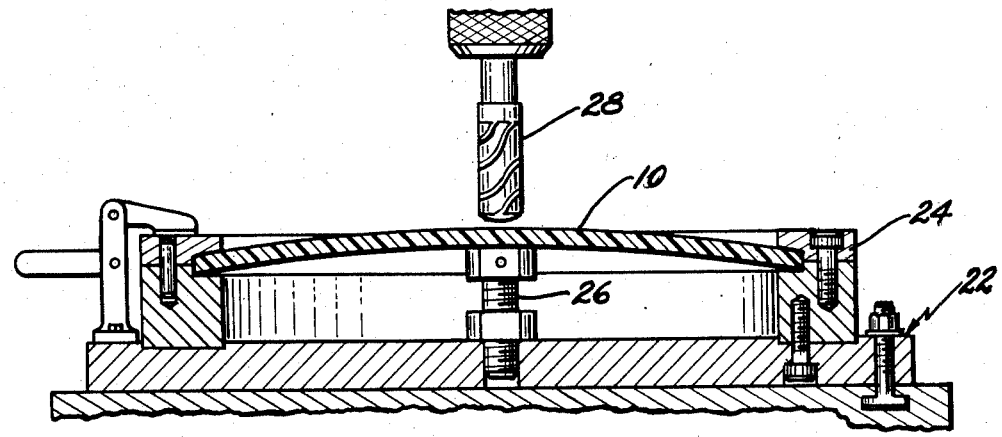
Figure 1 is a cross-section of the set-up on a milling machine for forming the device.
Figure 2:
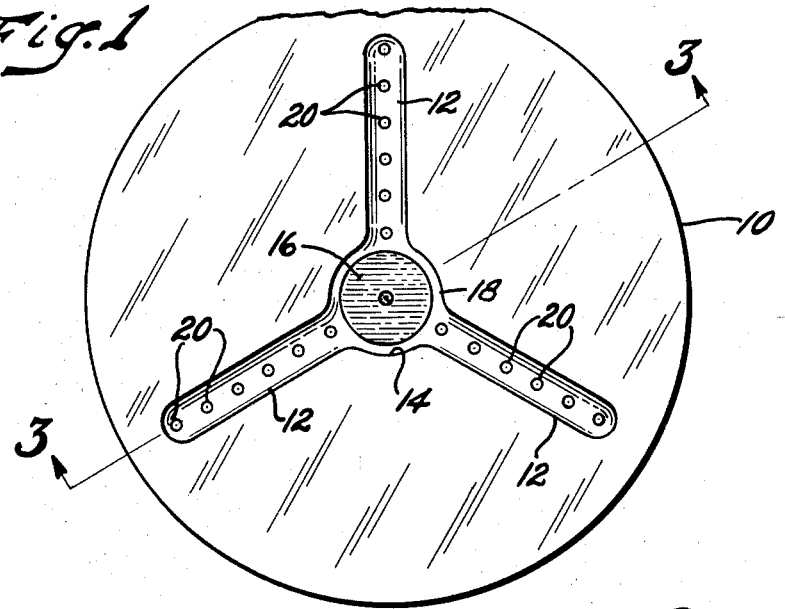
Figure 2 is a plan view.
Figure 3:
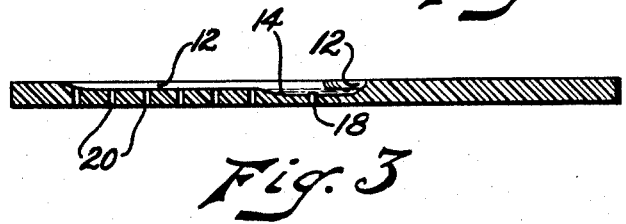
Figure 3 is a cross-section taken through one of the grooves and the central reservoir.
Figure 4:
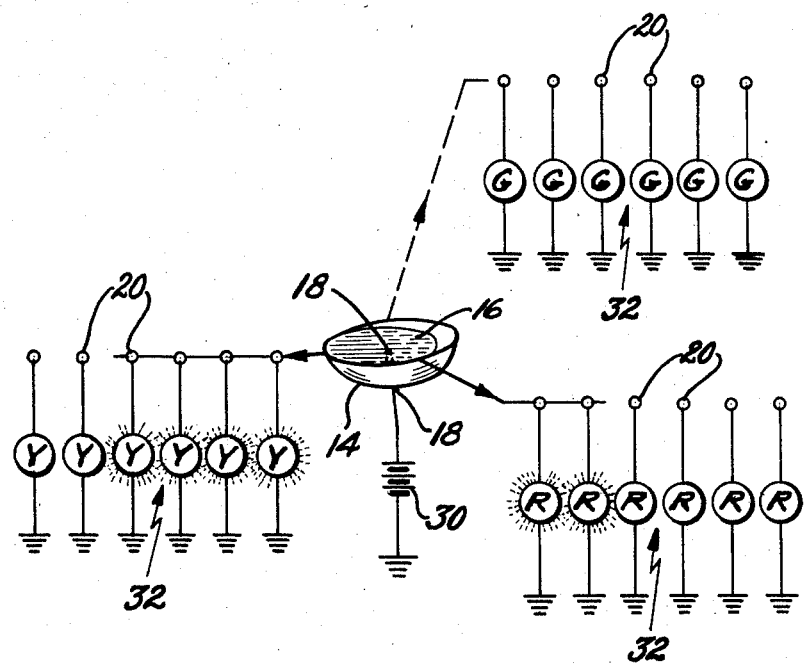
Figure 4 is a wiring diagram.

In the drawings, a plate 10 is illustrated as being formed of suitable plastic. Grooves 12 extend radially from a central reservoir 14 containing a pool of mercury 16. In the center of the reservoir 14, if the disc is plastic, is an electrical contact 18 and at regular intervals in grooves 12 similar electrical contacts 20 are fitted. If desired, the disc may be formed of metal in which case no central contact is needed, but contacts 20 are insulated from the disc. In Figure 1, a milling machine indexing assembly 22 is shown with plate 10 clamped thereto by metal ring 24 and supported in the center by a machinist's jack 26 preparatory to milling by cutter 28. A power source is indicated at 30 and a string of bulbs at 32 which are in series with the said power source, the pool of mercury 16 and the contacts 20.

In forming the plate 10, a suitable disc of metal or plastic is bolted to the milling machine index assembly 22 and held in position by the metal ring 24. Under the center of the said disc the machinist's jack 26 is placed and the jack raised until it forces the center of said disc a few thousandths of an inch above the level of the circumference thereof.

The milling cutter 28 is then used to cut a reservoir 14 to contain the mercury 16 and the three grooves 12 are then milled from the reservoir 14 toward the periphery of the said disc. It is apparent that if the milling cutter 28 is held in a fixed position the grooves 12 will be deeper at the center of the disc than at the edge thereof by an amount equal to the curvature of the disc which is regulated by the height of the said jack 26.

When the disc is released from the bed of the milling machine it springs back to a flat condition and the grooves will have a uniform gradient from the center toward the periphery of the disc.

This method of forming the plate gives the device great accuracy and any sensitivity desired, since the gradient from the center pool to the outside edge of the groove determines the sensitivity. This is easily controlled by the elevation of the center of the disc above the circumference when the plate is formed. The central pool is made sufficiently large to contain enough mercury to fill at least two of the grooves completely so that contact between the pool and the contacts in the grooves will not be broken when the device is tilted. The plate is then sealed in a metal case and the case attached to the device to be checked for plumb or level.

While the device as described is particularly useful in indicating the level condition of a stacked-beam radar height-finding antenna, usually at a distance from the operator, it is not confined to such use but may be employed in any situation where levelling may be required and where a source of current is available and there is room for a series of bulbs. The warning feature of the invention could be a buzzer or a bell, or any aural device, to call attention to an out of level condition and is not confined to the lighting of a bulb.

For use with a stacked-beam radar height-finding antenna system, with scale factors available, the amount of error in height information can be estimated from the angle of tilt shown by the device.

What I claim is:

1. In a level indicating device for use with stacked-beam radar height-finding system, a disc of suitable material having a central recess in said disc and three equally spaced grooves radiating from said central recess with a rising gradient toward the ends of said grooves, a pool of mercury contained in said central recess, a series of contacts in said grooves, means connecting said contacts through a power source and a series of lights to the central pool of mercury when mercury enters one or more of said grooves from said central recess when said disc is tilted.

2. In a level indicating device a plate of suitable material having a recess in the center of said plate, a pool of mercury in said recess, three grooves at 120 degree spacing radiating from said recess toward the periphery of said plate, said grooves having a uniform rise in gradient from the center recess toward the ends thereof, a series of contacts in said grooves, electric indicating means, means connecting said contacts to said indicating means, means connecting said indicating means to a source of power, and means connecting said power source to the central pool of mercury to permit flow of said mercury from said central recess to one or more of said grooves to complete the electric circuit through the indicating means when the said plate is tilted.

References Cited in the file of this patent

UNITED STATES PATENTS

| | | |
|---|---|---|
| 2,197,702 | Mohler | Apr. 16, 1940 |
| 2,338,811 | Hasbrook | Jan. 11, 1944 |

FOREIGN PATENTS

| | | |
|---|---|---|
| 319,815 | Germany | Apr. 3, 1917 |